United States Patent [19]

Fassbender

[11] 4,156,905
[45] May 29, 1979

[54] METHOD AND APPARATUS FOR IMPROVING ACCESS SPEED IN A RANDOM ACCESS MEMORY

[75] Inventor: Charles J. Fassbender, Plano, Tex.

[73] Assignee: NCR Corporation, Dayton, Ohio

[21] Appl. No.: 827,288

[22] Filed: Aug. 24, 1977

[51] Int. Cl.² .......................... G06F 7/34; G06F 9/06
[52] U.S. Cl. .................................... 364/200; 364/900
[58] Field of Search ... 364/200 MS File, 900 MS File

[56] References Cited

U.S. PATENT DOCUMENTS

| 3,244,470 | 3/1966 | Hagelbarger et al. | 364/900 |
| 3,654,622 | 4/1972 | Beausoleil | 364/900 |
| 4,048,671 | 9/1977 | Callahan et al. | 364/200 |

Primary Examiner—Mark E. Nusbaum
Assistant Examiner—C. T. Bartz
Attorney, Agent, or Firm—J. T. Cavender; Edward Dugas

[57] ABSTRACT

A method and apparatus for increasing access speed in a random access memory comprising the utilization of a prefetch register for receiving and temporarily storing a first address portion representing the location of a group of words stored in memory. The first address portion is subsequently utilized to access memory to retrieve a group of words to be stored in memory output registers; a second address portion is utilized to select words contained in the output registers of the memory. Several second address portions may address the various words stored in the output registers of the memory while the first address portion remains the same. When a subsequent group of words is to be accessed, a second first address portion is loaded into the prefetch register and the first address portion of the current requested address is compared with the presently used first address portion; a miscomparison generates a miscompare signal which clocks a new group of words into the output registers of the memory and simultaneously transfers the first address portion in the prefetch register to a present fetch register. Words are then retrieved from memory through the decoding of the second address portion to access words stored in the output registers.

17 Claims, 3 Drawing Figures

METHOD AND APPARATUS FOR IMPROVING ACCESS SPEED IN A RANDOM ACCESS MEMORY

BACKGROUND OF THE INVENTION

The present invention pertains to random access memory apparatus and methods, and more particularly, to a method and apparatus for decreasing the average access time of a random access memory system.

Random access memories are one of the most important functional components of a data processing system and frequently they dictate or limit the operational speed of the system. In addition, they frequently are a significant portion of the hardware of a data processing system, and thus account for a significant portion of the system's cost. Since storage capacity of random access memories is directly related to the overall cost of a data processing system, the size of such memory is an important factor when considering the design of the overall processing system; further, since random access memory speeds have become the limiting factor in some systems, an increase in the information access speed (decrease in access time) of the memory represents an increase in overall system power. For example, instruction storage units must be capable of sufficiently rapid access time to provide instructions to the data processing unit for it to operate upon data without the necessity of waiting for the delivery of such instructions.

The prior art has attempted to increase the speed of instruction storage units by various means. For example, U.S. Pat. No. 3,764,988—Onishi, describes an instruction processing device that differentiates between types of instructions to expedite retrieval of information in memory in preparation for execution of the next instruction. In this patent, the increased instruction unit speed is achieved through detection of branch instructions that result in advanced fetching of information in preparation for subsequent instructions. The fetching of the data is nevertheless constrained by the type of memory used in a manner described above. In U.S. Pat. No. 3,775,756—Balser, the next instruction to be supplied to the processor is retrieved from the instruction memory and stored in an instruction register. The accessing and retrieval of the individual instructions from the instruction memory is, however, conventional and the speed limitations of the storage unit containing the instructions will limit the operational speed of the overall system unless high speed storage devices are used.

Random access memories have been constructed utilizing bipolar or high speed emitter coupled logic (ECL) chips. However, such ECL chips are relatively expensive when compared with the slower, high storage capacity, metal oxide semiconductor (MOS) chips. Thus, the relatively slow access time required of instruction storage units using MOS chips (usually around 400 nanoseconds), is a major limitation of their use. Conversely, ECL technology presently operates at a much higher speed (around 25 nanoseconds) but a major limitation of its use is its small storage capacity per chip (or high cost per bit of storage).

It is therefore an object of the present invention to provide a method and apparatus for decreasing the access time of a random access memory while retaining the benefits of high storage capacity but slower circuit construction techniques.

It is another object of the present invention to provide a method and apparatus for decreasing memory access time in an instruction storage unit while using relatively low speed random access memory circuit chips.

It is still another object of the present invention to provide a method and apparatus for increasing the speed of a random access memory by permitting groups of words or instructions to be accessed at a relatively low speed while selectively utilizing high speed elements within the memory array to select specific words or instructions from the previously accessed group.

These and other advantages of the present invention will become apparent to those skilled in the art as the description thereof proceeds.

SUMMARY OF THE INVENTION

Briefly, in accordance with the embodiment chosen for illustration, an array of MOS random access memory, serial-in parallel-out (SIPO) chips are arranged to provide addressed words, or portions of words at output registers on each of the chips. The contents of the output registers comprise a group of words which has been addressed by a first portion of an address defining the group of words in memory. A second portion of the address is decoded and applied to the plural registers to select a specific word from among the group of words previously accessed. The processor with which the present invention is used is programmed to make use of the rapid availability of the group of words stored in the output registers; that is, iterative loops may be formed by the instructions or words contained within each group. The access time of words within each group is significantly lower than the access time for the group.

Under program control, when a new group of instructions or words is to be accessed, the first address portion of an instruction address which defines a group of words in a memory is loaded into a prefetch register. The first portion of the new address remains in the prefetch register until called upon to retrieve a new group of words. The address of the present group of words contained within the output registers of the respective chips is retained in a present fetch register which is coupled to a compare circuit. As new addresses are applied to the system for accessing individual instructions, the first address portion is continuously compared with the contents of the present fetch register; if the first address portion of the incoming requested address is not identical to the first address portion stored in the present fetch register, a miscompare clock signal is generated which clocks the contents of the prefetch register into the present fetch register, and clocks the prefetched group of words or instructions into the respective output registers of the individual chips. The second portion of the new address is then decoded and utilized to select a predetermined instruction from the group of instructions.

The above steps are repeated and individual instructions from within the group of instructions are accessed at high speed from the registers of the individual chips; the prefetch register may be loaded with the first address portion of an instruction address defining a group of instructions to be fetched resulting in the "prefetching" of the group of instructions for loading into the output registers. The system will continue to operate within the group of instructions or words contained in the output registers until a miscompare clock is generated by the non-identity of the first address portion of an incoming address and the contents of the present fetch register, at which time, the prefetched words are clocked into the output registers.

BRIEF DESCRIPTION OF THE DRAWINGS

The present invention may more readily be described by reference to the accompanying drawings in which.

DESCRIPTION OF THE PREFERRED EMBODIMENT OF THE INVENTION

Figure 1:
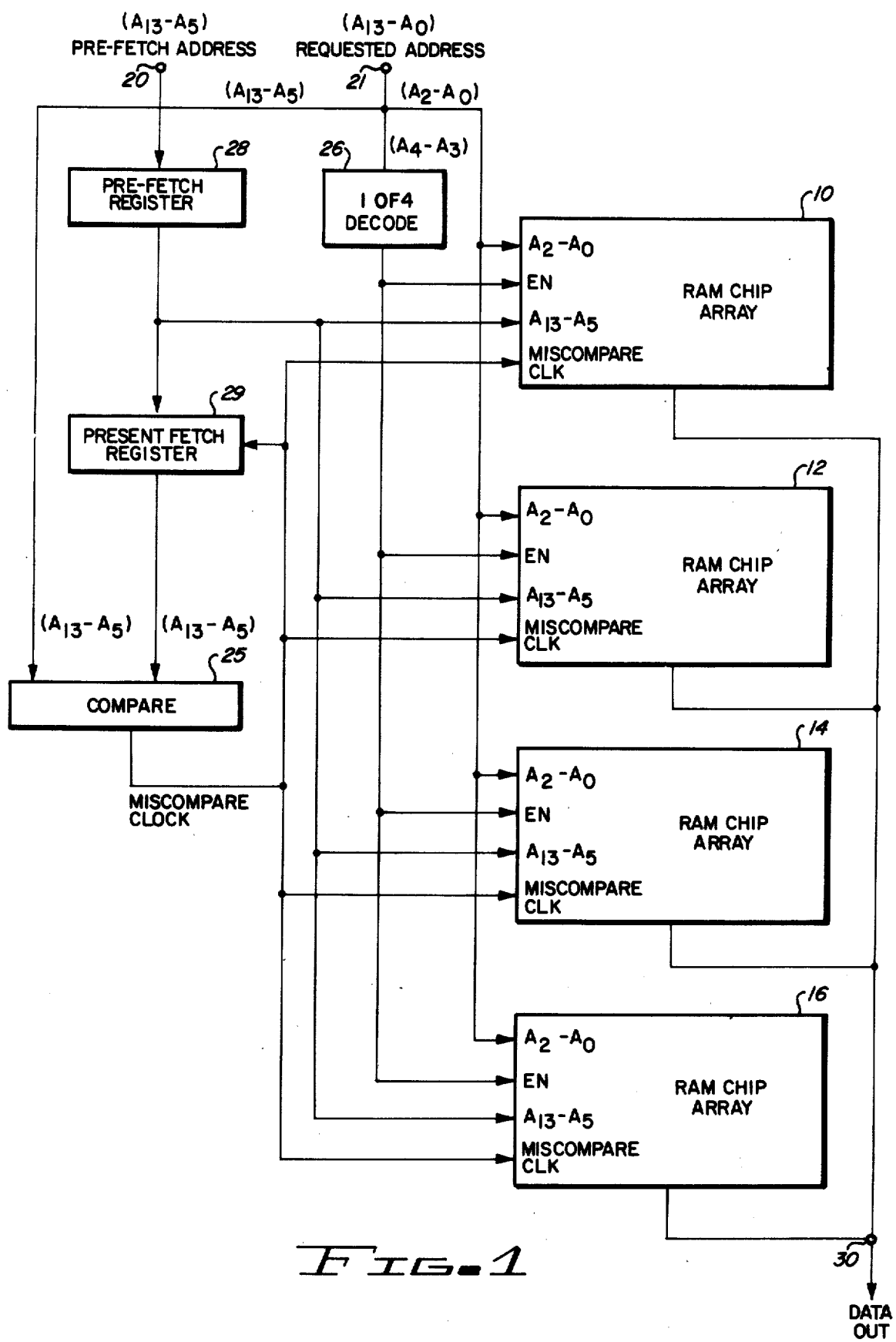
FIG. 1 is a schematic block diagram of a random access memory system incorporating the teachings of the present invention.

Referring now to FIG. 1, the embodiment chosen for illustration is connected to receive requested addresses and prefetch addresses from a processing system (not shown) under program control. In the embodiment chosen for illustration, and to facilitate the description, a 16K memory has been chosen for storing 18-bit words on serial-in parallel-out (SIPO) random access memory MOS chips which are the subject of copending United States application Serial No. 764,603, filed Feb. 1, 1977, now U.S. Pat. No. 4,106,109; issued Aug. 8, 1978 and assigned to Assignee of the present invention. These chips are configured so that each chip stores one bit of 4K words. Thus, eighteen chips are required for storing 4K eighteen bit words. Since the memory size has been chosen as 16K words, four chip arrays are required each array comprising eighteen chips and each array storing 4K words. The random access memory chip arrays 10, 12, 14 and 16 of FIG. 1 therefore each comprise eighteen individual SIPO random access memory chips, each array storing 4K words. Fourteen bits are utilized in the address to access the 16K words in memory; the address bits are divided into a first address portion ($A_{13}$-$A_5$) and a second address portion ($A_5$-$A_0$).

Address information is applied to the system through input terminals 20 and 21; the current requested addresses $A_{13}$-$A_0$ are applied to input terminal 21 to retrieve the instructions or words stored at that address while prefetch addresses $A_{13}$-$A_5$ are applied to input terminal 20 under processor program control to prefetch groups of instructions or words for future retrieval. In the drawing of FIG. 1, it will be understood that single lines are shown for simplicity and that a fourteen bit address, for example, will obviously require fourteen conductors. Similarly, a line in FIG. 1 that is indicated as having address bits $A_2$-$A_0$ thereon will obviously be a three conductor line.

The requested address on input terminal 21 comprises fourteen bits $A_{13}$-$A_0$ which are applied to the system as follows: address bits $A_{13}$-$A_5$ are applied to a compare circuit 25 for purposes to be described later, bits $A_4$-$A_3$ are applied to a one-of-four decode circuit 26, while bits $A_2$-$A_0$ are applied to each of the chip arrays 10, 12, 14 and 16. The output of the one-of-four decode 26 is four enable signals that are selectively applied to one of the four chip arrays 10, 12, 14 and 16. That is, address bits $A_4$ and $A_3$ are utilized to select one of the four chip arrays from which are retrieved desired instructions or words.

Input terminal 20 receives a prefetched address which consists of only the first portion $A_{13}$-$A_5$ of instruction addresses that are to be accessed in the future. The first address portion therefore defines the address of a group of instructions or words which may be "prefetched" as will be explained. The prefetch address applied to the input terminal 20 is applied to, and loaded into, a prefetch register 28, the output of which is applied to each of the chip arrays 10, 12, 14 and 16. Thus, the application of the first portion of the address $A_{13}$-$A_5$ from the prefetch register to each of the arrays results in the retrieving from the arrays of a group of 32 instructions or words stored in those locations having an address corresponding to the contents of the prefetch register bit $A_{13}$-$A_5$. The instructions or words located at the prefetch address are not loaded into the output registers of the respective chips until a miscompare clock signal is applied to each of the arrays.

A present fetch register 29 is connected to the prefetch register 28 and receives and stores the contents of the prefetch register when a miscompare clock signal is applied thereto. The output of the present fetch register, the first portion of the address $A_{13}$-$A_5$ of the currently accessed group of instructions in storage, is applied to the compare circuit 25 and during each instruction cycle is compared with the corresponding first address portion $A_{13}$-$A_5$ of the presently requested address applied to the input terminal 21. The non-identity or miscompare of the corresponding first portions of the addresses from the present fetch register 29 and the input terminal 21 results in the generation of a miscompare clock signal that is applied to the present fetch register 29 as well as to the chip arrays 10, 12, 14 and 16. The instructions or words being retrieved from the arrays are presented to an output terminal 30; again, although the drawing indicates the data transmission path by a single line, the output, in the embodiment chosen for illustration, will be an eighteen bit word transmitted over an eighteen conductor cable.

Figure 2:
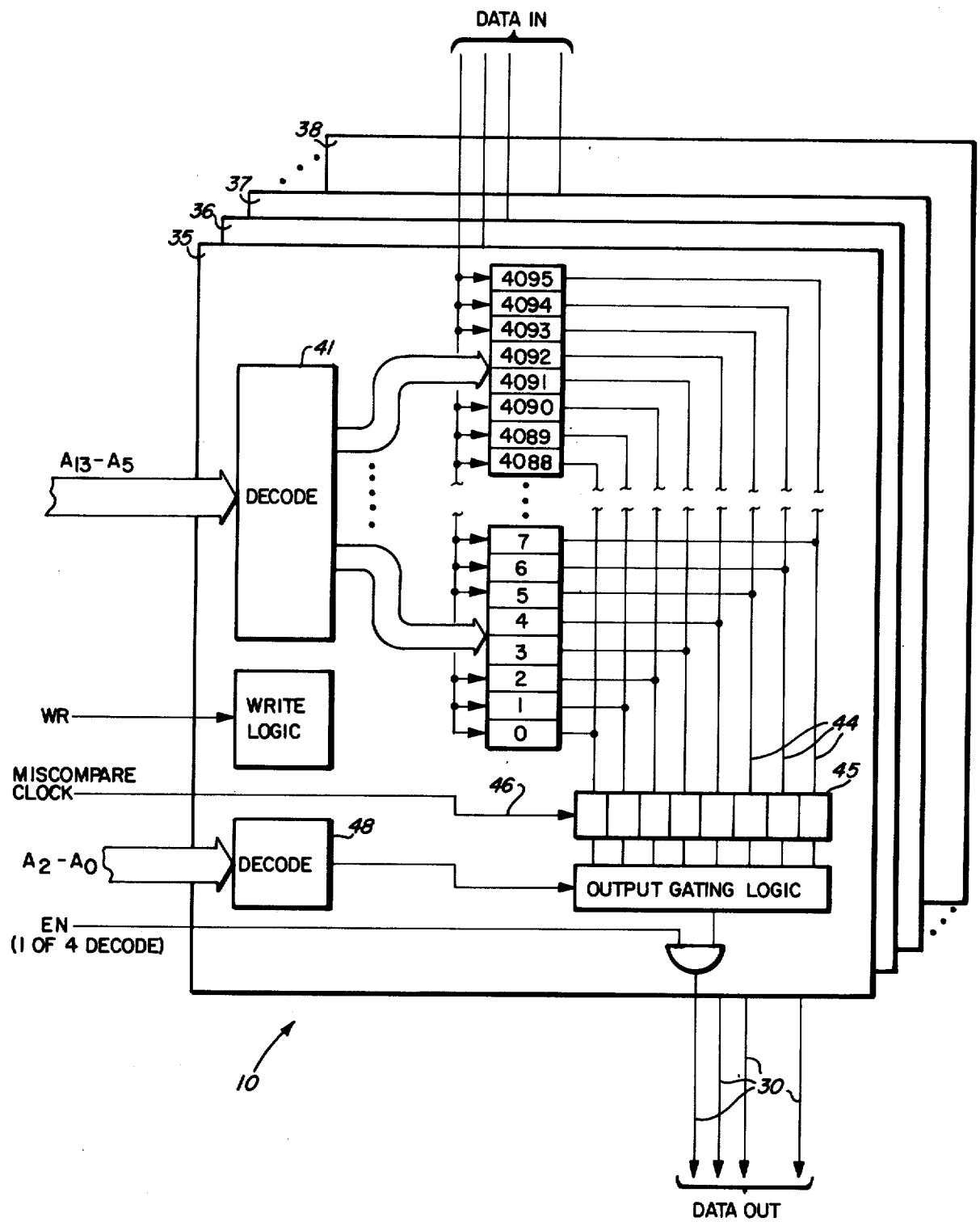
FIG. 2 is a schematic block diagram illustrating an appropriate random access memory chip array for use in the system of FIG. 1.

The description of the present invention may be facilitated by reference to FIG. 2 wherein a more detailed representation of the random access memory chip arrays of FIG. 1 is shown. Referring to FIG. 2, the random access memory chip array 10 is shown in greater schematic detail. The array is a parallel access storage array comprising a plurality of SIPO random access memory chips; the embodiment chosen for discussion utilizes eighteen bit words, the array 10 incorporates eighteen chips such as those shown at 35, 36, 37 and 38. Each of the chips includes 4K storage locations (actually 4095 locations) divided into groups of eight bits each (0-7, 8-15, . . . 4088-4095). Address bits $A_{13}$-$A_5$ applied to a conventional decode circuit 41 selects one of the eight-bit groups of the 4K bits on the chip. When an eight-bit group is selected, the logic levels of the selected eight storage elements are applied to the eight output lines 44.

Eight bits are therefore represented by the logic levels on the lines 44 which are applied to an output register 45; however, the information represented by the logic level on the lines 44 is not clocked into the register 45 until a miscompare clock signal appears on line 46 which clocks the information on lines 44 into the output register 45. It may be noted at this time that the first portion of the address, bits $A_{13}$-$A_5$, are received from the prefetch register 28 of FIG. 1 such that the logic levels present on lines 44 represent the first address portion of a group of words or instructions that have been prefetched; further, the information stored in the output register 45 represents the first address portion, $A_{13}$–$A_5$, of the group of words or instructions that are presently being accessed by the requested address applied to input terminal 21 of FIG. 1.

Address bits $A_2$–$A_0$ are applied to a conventional decode circuit 48 for selecting one of the bits stored in the output register 45; therefore, a single bit of an eighteen bit output word has been selected on the chip 35. Similarly, a single bit of the eighteen bit output is selected on each of the chips 35, 36, 37, etc., in the array 10. The end result of the selection is an eighteen bit word, one bit of which is contained in each of the eighteen output registers of the eighteen chips in the array. Since each of the random access memory chip arrays 10, 12, 14 and 16 receives address bits $A_{13}$–$A_5$ and address bits $A_2$–$A_0$, the memory system will have retrieved four words or instructions of eighteen bits each selected in each of the arrays. Address bits $A_4$–$A_3$ are thus decoded in the one-of-four decode 26 to generate an enable signal and therefore select which of the random access memory chip arrays is to be gated to the output terminal 30.

Figure 3:
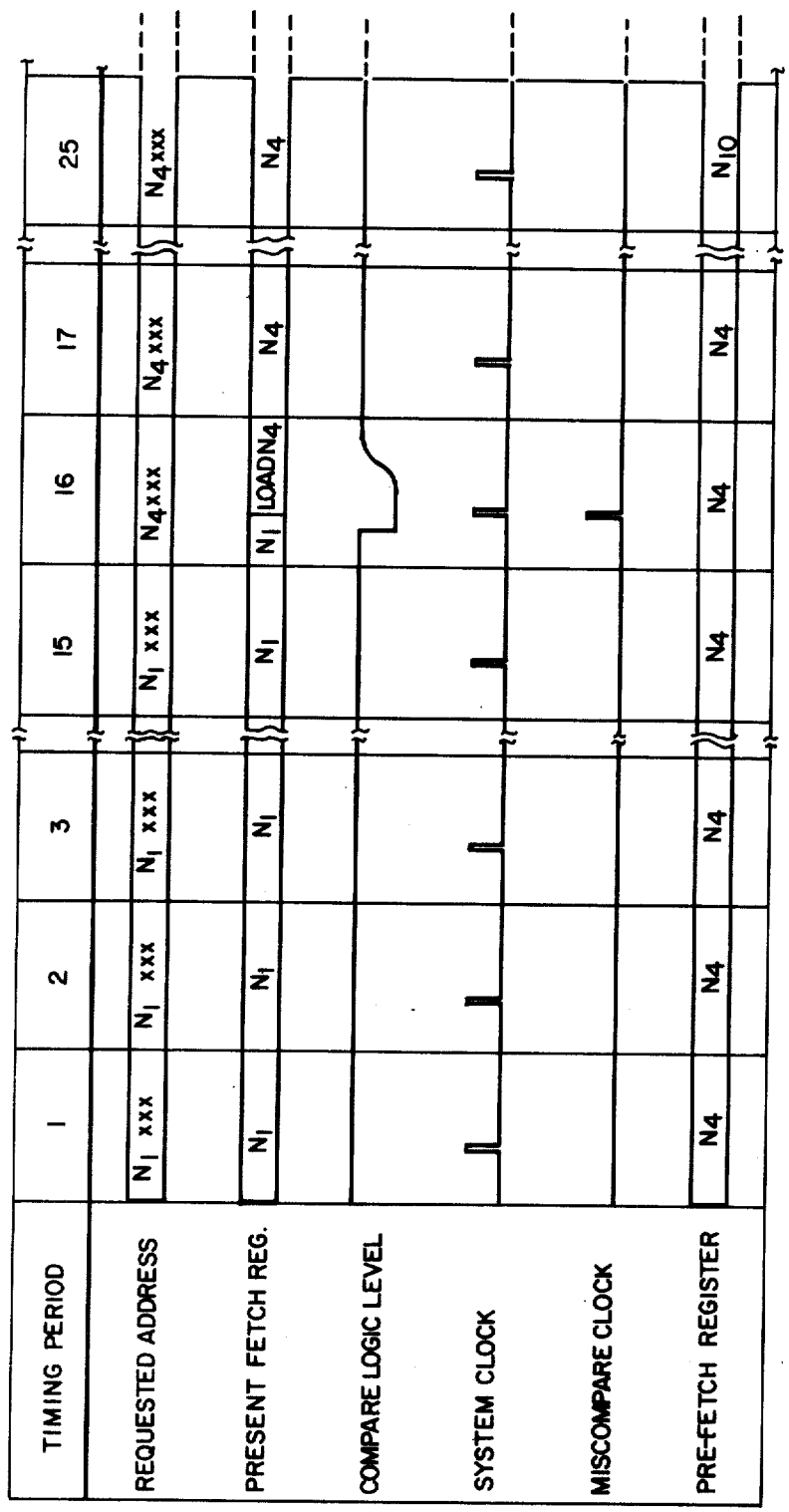
FIG. 3 is a representative timing diagram useful in describing the method and apparatus of the present invention.

The description of the embodiment chosen for illustration may be facilitated by reference to the timing diagram of FIG. 3. FIG. 3 is an idealized schematic timing chart indicating the sequence of events when retrieving a word from the memory described in connection with FIGS. 1 and 2. In FIG. 3, the first address portion of a word address ($A_{13}$–$A_5$) is conveniently designated by the numeral "N." The second portion of the address is indicated by the generalized notation "xxx." The diagram of FIG. 3 is intended to illustrate the sequence of events when a group of words having the common first address portion $N_1$ has been loaded into the output registers on the various chips and a second group of words having a second common first address portion $N_4$ is subsequently to be loaded into the output registers for future use.

The first line of FIG. 3 simply represents arbitrary timing periods to facilitate the description of events occurring during succeeding time intervals. The second line of FIG. 3 is a schematic notation of successive addresses applied to input terminal 21 of FIG. 1; the requested address is represented by a first address portion $N_1$ and a second address portion xxx. During successive timing periods, the requested address will normally maintain the same first address portion $N_1$ while the second address portion will change during succeeding periods to permit the program to retrieve instructions temporarily stored in the output registers of the various chips. The third line of FIG. 3 represents the contents of the present fetch register. The present fetch register contains the first address portion of the present contents of the output registers in the memory. The purpose of the present fetch register will become apparent as the description proceeds.

The fourth line of FIG. 3 illustrates a logic level on the output line from the compare circuit 25. For purposes of illustration, the compare logic level is shown to be "high" until a miscompare occurs whereupon the level switches to "low" until the first address portions applied to the compare circuit 25 are again identical. The fifth line of FIG. 3 represents a system clock which designates the time within each timing block that the system will clock the various circuits and synchronize the transfer of information among the various elements of the system. The system clock may be a clock supplied by the data processing system to which the present memory system is connected or may be a memory clock independent of the data processing system. The sixth line of FIG. 3 represents the occurrence of a miscompare clock signal generated by the compare circuit 25 and applied to the present fetch register 29 as well as to each of the chips in each of the arrays 10, 12, 14 and 16. The seventh and final line of FIG. 3 represents the contents of the prefetch register. It may be noted that the sample chosen for illustration in FIG. 3 indicates that a first address portion $N_4$ of a new group of instruction words has been loaded into the prefetch register and remains there until the next succeeding group of instruction words, having a common first address portion $N_{10}$, is loaded therein.

A sequence of operation of the present invention may now be described by reference to FIG. 3. During the first timing period, the present fetch register contains the first address portion $N_1$ of a group of instructions or words stored in memory. The current requested address during timing period 1 includes the first address portion $N_1$ corresponding to the contents of the present fetch register. Since the current requested address and the present fetch register have the same first address portion, the compare logic level remains "high" at the time that the systemclock occurs. Since there is no change in the compare logic level, no miscompare clock signal occurs. It may be noted however, that during timing period 1, the prefetch register has been loaded with the first address portion $N_4$ of a new group of words to be fetched from memory. Thus, at this period of time, the status of FIG. 1 is as follows: the word requested by the address applied to the input terminal 21 results in the requested eighteen bit word applied to the output terminal 30; the present fetch register contains a first address portion that is identical to the first address portion applied to the input terminal 21 and a positive comparison is made by the compare circuit 25. No miscompare clock signal is generated, and no miscompare clock is therefore applied to the present fetch register or any of the random access memory arrays. The prefetch register 28 contains the first address portion of the next group of instructions to be retrieved from the arrays; the first address portion in the prefetch register 28 has already been applied to each of the chips and has resulted in decode logic 41 beginning selection of a group of eight bits onto lines 44. This selection process is relatively slow (400 nanoseconds for example). Thus, if timing periods 1, 2, . . . of FIG. 3 are 50 nanoseconds each, it would take eight time periods; after the eighth time period, the prefetched information would be on leads 44, ready for clocking into register 45 on a miscompare clock.

The circumstances obtaining during timing period 2 are the same as those occurring in timing period 1. However, the second address portion "xxx" will change from timing period to timing period to thus select predetermined ones of the words stored in the output registers of the circuit chips. It may be noted that the access time during each of these timing periods is low in view of the fact that the information being retrieved from memory is stored in output registers and is not being retrieved from the relatively slow SIPO storage elements which may be MOS. Thus, in FIG. 3, the first fifteen timing periods have been illustrated as timing periods wherein the only change from each successive requested address has been the change of the second address portion to therefore require only that the accessed word be retrieved from the output registers.

In timing period 16, it may be noted that the requested address now contains the first address portion $N_4$ which differs from the first address portion $N_1$ contained in the present fetch register. A compare logic level is thus changed to "low" and, upon receipt of the system clock, a miscompare clock signal is generated by the compare circuit 25. The miscompare clock signal is applied to the present fetch register 29 which clocks into the present fetch register the contents of the prefetch register 28. Therefore, within timing period 16, the present fetch register 28 is changed from first address portion $N_1$ to first address portion $N_4$. Simultaneously, the miscompare clock signal is applied to each of the chips in the memory system; as stated previously in connection with the description of FIG. 2, the miscompare clock signal clocks the logic levels on lines 44 into the output register 45 of each of the SIPO chips. Therefore, timing period 16 includes the loading of a new group of instruction words into the output registers of the SIPO chips, the selection of one of the newly loaded words for application to the output terminal, and the transfer of the first address portion contained in the prefetch register into the present fetch register.

Timing period 17 indicates that the requested address includes a first address portion $N_4$ which coincides with the contents of the present fetch register; therefore, the compare logic level remains "high" and no miscompare clock signal is generated. The time periods 18–25 are similarly with only the second address portion of the requested address changing. However, during time interval 25 for example, the prefetch register has been loaded with a new first address portion $N_{10}$. The new first address portion in the prefetch register causes the logic levels on the lines 44 in each of the SIPO chips in the memory system to assume the appropriate logic levels corresponding to the new group of words to be accessed when the next miscompare clock signal occurs.

The registers and compare circuit of FIG. 1 are typical and conventional and need not be described in greater detail; further, the SIPO random access memory chips chosen for illustration may incorporate usual decode logic, output registers, and gating logic. A 4096×1 organization with an 8-bit output register has been described as an example only; an SIPO chip organization such as a 16K×1 chip with 32-bit output register is easily incorporated into the present design. The utilization of a prefetch register for "prefetching," but not loading output registers, in combination with a continuous comparison of the contents of a present fetch register with the presently requested address permits the utilization of relatively slow but inexpensive MOS random access memory chip technology while simultaneously achieving speeds presently obtainable only in much more expensive and low storage capacity IC technology. By arranging the computer program to operate inside, or loop within, the word groups that are accessed by the first address portion of the address, substantially all of the time utilized in accessing memory and retrieving words or commands will be spent inside a group of commands rather than between groups of commands. The process of fetching a particular word from a group of prefetch words in the output registers can be made to occur at very high speeds; for example, comparator circuits typically operate at less than 25 nanoseconds while the output selection logic on a typical MOS SIPO random access memory chip can be made very fast since it involves only a very small number of gates. The transistors in the output logic gating may be made for fast operation time by means of specially doped MOS transistors or bipolar transistors.

After the computer program has executed many instructions or commands within a group of prefetched instructions, it will eventually jump to the next group which it had previously requested to be prefetched. When this jump occurs, the output registers inside of the individual random access memory chips are loaded, the prefetch register contents are transferred to the present fetch register, and the whole process described above continues. The principal advantage of the described prefetching technique is that it permits high speed information storage units to be implemented with much fewer and less expensive chips than would otherwise be required to accomplish the same task. For example, using high speed ECL techniques to build an instruction storage unit of 16K words eighteen bits wide, taking into account that the largest density of an ECL chip is 1K, would require 288 chips. By comparison, using 4K×1 SIPO random access memory chips, only 72 chips would be required. In addition, the SIPO random access memory MOS chips are typically substantially less expensive than the ECL random access memory chips. The present invention therefore presents significant cost savings without sacrificing memory system speed.

I claim:

1. In a random access memory system incorporating a plurality of storage locations for storing words therein, each word having a predetermined address including a first and second address portion, the improvement comprising:
    (a) a first input for receiving first address portions of words to be fetched;
    (b) a second input for receiving first and second address portions of words to be fetched prior to the words represented by the first address portions received at said first input;
    (c) a first temporary storage means connected to said first input for receiving and temporarily storing said first address portions;
    (d) a second temporary storage means for receiving a miscompare signal, and connected to said first temporary storage means for receiving and temporarily storing the first address portion stored in said first temporary storage means upon receipt of said miscompare signal;
    (e) a compare circuit connected to said second input and to said second temporary storage means for comparing the first address portion stored in said second temporary storage means and the first address portion on said second input and for generating said miscompare signal when said first address portions are not identical; and
    (f) a storage array having an output register, said array connected to said second input for receiving said second address portion, and connected to said first temporary storage means for receiving said temporarily stored first address portion, and connected to receive said miscompare signal, said array responsive to said miscompare signal for loading said output register with the contents of said array at said first address portion, and responsive to said second address portion for selecting a portion of the contents of said output register.

2. The improved random access memory system of claim 1 wherein said first temporary storage means comprises a prefetch register, said second temporary storage means comprises a present fetch register, and wherein said compare circuit compares the contents of said present fetch register with the address on said second input to generate said miscompare signal when said addresses are not identical.

3. The improved random access memory system of claim 1 including a plurality of storage arrays each having an output register, and wherein said arrays are responsive to said miscompare signal for loading the output registers thereof with the contents of said arrays at said first address portion and wherein said arrays are responsive to said second address portion for selecting a portion of the contents of each of said output registers.

4. The improved random access memory system of claim 3 wherein said parallel access storage array comprises a plurality of SIPO random access memory chips each having an output register.

5. The improved random access memory system according to claim 3 wherein the high order bits of said second address portion enable selected ones of said output registers, and the low order bits retrieve selected bits from the selected ones of said output registers.

6. The improved random access memory system of claim 2 including a plurality of storage arrays each having an output register, and wherein said arrays are responsive to said miscompare signal for loading the output registers thereof with the contents of said arrays at said first address portion and wherein said arrays are responsive to said second address portion for selecting a portion of the contents of each of said output registers.

7. In a random access memory system incorporating a plurality of storage locations for storing words therein, each word having a predetermined address including a first and second address portion, the improvement comprising:
  (a) a first input terminal for receiving first address portions of words to be fetched;
  (b) a second input terminal for receiving first and second address portions of words to be fetched prior to the words represented by the first address portions received at said first input;
  (c) a first temporary storage means connected to said first input terminal for receiving and temporarily storing said first address portions;
  (d) a second temporary storage means connected to receive a miscompare signal, and connected to said first temporary storage means for receiving and temporarily storing the first address portion stored in said first temporary storage means upon receipt of said miscompare signal;
  (e) a compare circuit connected to said second input terminal and to said second temporary storage means for comparing the first address portion stored in said second temporary storage means and the first address portion on said second terminal for generating a miscompare signal when said address portions are not identical; and
  (f) a parallel access storage array having a multi-bit output register, said array connected to said first temporary storage means for receiving said temporarily stored first address portion and for accessing multi-bits in response thereto, connected to receive said miscompare signal for loading said multi-bit output register in parallel with said accessed multi-bits in response to said miscompare signal, and connected to said second address portion thereon for selectively reading bits from said output register.

8. The improved random access memory system of claim 7 including a plurality of storage arrays each having an output register, and wherein said arrays are responsive to said miscompare signal for loading the output registers thereof with the contents of said arrays at said first address portion and wherein said arrays are responsive to said second address portion for selectively retrieving bits from selected ones of said output registers.

9. The improved random access memory system according to claim 8 wherein the high order bits of said second address portion enable selected ones of said output registers, and the low order bits retrieve selected bits from said enabled output registers.

10. A method for decreasing the average access time to a random access memory system, said system incorporating a plurality of storage locations for storing words therein, each word having a predetermined address including a first and second address portion, comprising the steps of:
  (a) temporarily storing a first common first address portion;
  (b) accessing all storage locations in said random access memory system having said first common first address portion;
  (c) temporarily storing all accessed words in said storage location having said common first address portion;
  (d) decoding said second address portion and selecting one of said temporarily stored accessed words indicated by said decoded second address portion;
  (e) receiving a second common first address portion and comparing it to said temporarily stored first common first address portion; and
  (f) generating a miscompare signal when said first common first address portion and said second common first address portion are not identical.

11. The method of claim 10 including the additional steps of:
  (g) temporarily storing said second common first address portion in response to said miscompare signal; and
  (h) repeating steps (d) and (e) for said second common first address portion.

12. The method of claim 10 wherein step (d) is repeated for selecting successive different ones of said temporarily stored words each indicated by a different second address portion.

13. The method of claim 11 wherein step (d) is repeated for selecting successive different ones of said temporarily stored words each indicated by a different second address portion.

14. A method for decreasing the average access time to a random access memory system, said system incorporating a plurality of storage locations for storing words therein, each word having a predetermined address including a first and second address portion, comprising the steps of:
  (a) temporarily storing a first common first address portion;
  (b) accessing at a given speed all storage locations in said random access memory system having said first common first address portion;
  (c) temporarily storing all accessed words in said storage location having said common first address portion;

(d) decoding the second address portion of a requested address and selecting at a speed faster than said given speed one of said temorarily stored accessed words indicated by the decoded second address portion of said requested address;

(e) temporarily storing a second common first address portion and accessing at said given speed all storage locations in said random access memory having said second common first address portion; and (f) generating a miscompare signal when the first address portion of said requested address and said second common first address portion are not identical.

15. The method of claim 14 including the additional steps of:

(g) temporarily storing all words in said storage location having said second common first address portion in response to said miscompare signal; and (h) repeating steps (d) and (e) for said second common first address portion.

16. The method of claim 14 wherein step (d) is repeated for selecting successive different ones of said temporarily stored words each indicated by a different second address portion.

17. The method of claim 15 wherein step (d) is repeated for selecting successive different ones of said temporarily stored words each indicated by a different second address portion.

* * * * *